(12) United States Patent
Liu et al.

(10) Patent No.: US 11,402,942 B2
(45) Date of Patent: Aug. 2, 2022

(54) ARRAY SUBSTRATE AND DISPLAY DEVICE

(71) Applicants: Beijing BOE Display Technology Co., Ltd., Beijing (CN); BOE Technology Group Co., Ltd., Beijing (CN)

(72) Inventors: Yi Liu, Beijing (CN); Shijun Wang, Beijing (CN); Wenkai Mu, Beijing (CN); Bo Feng, Beijing (CN); Xinlan Yang, Beijing (CN); Xiaoxiao Chen, Beijing (CN); Yang Wang, Beijing (CN); Zhan Wei, Beijing (CN); Tengfei Ding, Beijing (CN); Xiaofeng Yin, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 12 days.

(21) Appl. No.: 17/258,150

(22) PCT Filed: Mar. 24, 2020

(86) PCT No.: PCT/CN2020/080981
§ 371 (c)(1),
(2) Date: Jan. 5, 2021

(87) PCT Pub. No.: WO2021/189270
PCT Pub. Date: Sep. 30, 2021

(65) Prior Publication Data
US 2022/0137770 A1 May 5, 2022

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05)

(58) Field of Classification Search
CPC .......................... G06F 3/04164; G06F 3/0443
USPC ......................................................... 345/173
See application file for complete search history.

(56) References Cited

U.S. PATENT DOCUMENTS

| 2012/0068200 | A1* | 3/2012 | Oh ..................... G02F 1/136227 438/34 |
| 2015/0001512 | A1 | 1/2015 | Huang et al. |
| 2017/0192564 | A1* | 7/2017 | Li ......................... G06F 3/0446 |
| 2018/0143711 | A1 | 5/2018 | Ono |
| 2018/0321788 | A1* | 11/2018 | Kimura ............... G02F 1/13306 |
| 2019/0072798 | A1* | 3/2019 | Aichi .................... H01L 27/124 |
| 2021/0232263 | A1* | 7/2021 | Feng ..................... G06F 3/0446 |

FOREIGN PATENT DOCUMENTS

| CN | 104282710 A | 1/2015 |
| CN | 104866161 A | 8/2015 |
| CN | 107562270 A | 1/2018 |
| CN | 109582179 A | 4/2019 |

* cited by examiner

*Primary Examiner* — Mark Edwards
(74) *Attorney, Agent, or Firm* — IPro, PLLC

(57) ABSTRACT

The present disclosure provides an array substrate and a display device. The array substrate includes: a base substrate; a plurality of gate lines on the base substrate; and a touch electrode layer located on a side, away from the base substrate, of a layer where the gate lines are located. The touch electrode layer includes a plurality of touch electrodes, and the touch electrodes are provided with first hollowed-out areas at the positions of at least part of the gate lines.

20 Claims, 3 Drawing Sheets

ARRAY SUBSTRATE AND DISPLAY DEVICE

CROSS REFERENCE TO RELATED DOCUMENTS

The present application is a national phase entry under 35 U.S.C. § 371 of International Application No. PCT/CN2020/080981, filed on Mar. 24, 2020.

FIELD

The present disclosure relates to the technical field of display, in particular to an array substrate and a display device.

BACKGROUND

With the rapid development of display technology, touch screen panels have gradually spread throughout people's lives. According to the principle of touch sensing, existing touch screen panels include resistive touch screen panels, capacitive touch screen panels, surface infrared touch screen panels and so on. Capacitive touch screen panels are sought after by more and more consumers for high light transmittance, abrasion resistance, resistance to environmental temperature changes, resistance to environmental humidity changes, long service life and advanced complex functions such as multi-touch.

SUMMARY

Embodiments of the present disclosure provide an array substrate which includes:

a base substrate;

a plurality of gate lines on the base substrate; and a touch electrode layer located on a side, away from the base substrate, of a layer where the gate lines are located;

the touch electrode layer includes a plurality of touch electrodes, and the touch electrodes are provided with first hollowed-out areas at positions of at least part of the gate lines.

Optionally, in the above-mentioned array substrate provided by the embodiments of the present disclosure, the touch electrodes are provided with the first hollowed-out areas at positions of all the gate lines.

Optionally, in the above-mentioned array substrate provided by the embodiments of the present disclosure, each touch electrode includes a plurality of first touch electrodes, and a second touch electrode surrounding the first touch electrodes.

The second touch electrode is spaced and insulated from each of the first touch electrodes.

Optionally, in the above-mentioned array substrate provided by the embodiments of the present disclosure, the touch electrode layer further includes: a plurality of first lap joint parts, and the first lap joint parts are connected to the first touch electrodes or the second touch electrodes on the two sides of the first hollowed-out areas.

Optionally, the above-mentioned array substrate provided by the embodiments of the present disclosure further includes a plurality of data lines intersecting with the gate lines, and the first lap-joint parts are arranged in blue sub-pixel areas defined by the gate lines and the data lines in a one-to-one correspondence mode.

Optionally, in the above-mentioned array substrate provided by the embodiments of the present disclosure, each data line is composed of a plurality of polyline segments, and the angle between each of the polyline segments and the vertical direction of the gate lines is an acute angle, and two polyline segments located on the two sides of the same gate line are in mirror symmetry with respect to the same gate line.

Optionally, the above-mentioned array substrate provided by the embodiments of the present disclosure further includes: a plurality of touch lines arranged in the same layer as the data lines, and the extension direction of the touch lines is parallel to the extension direction of the data lines.

The touch electrodes are further provided with second hollowed-out areas at the positions of the touch lines, and the extension direction of the second hollowed-out areas is parallel to the extension direction of the touch lines.

Optionally, in the above-mentioned array substrate provided by the embodiments of the present disclosure, the touch lines are located in the blue sub-pixel areas.

Optionally, in the above-mentioned array substrate provided by the embodiments of the present disclosure, the area of the touch electrodes in the blue sub-pixel areas is larger than the area of the touch electrodes in red sub-pixel areas and green sub-pixel areas defined by the gate lines and the data lines.

Optionally, in the above-mentioned array substrate provided by the embodiments of the present disclosure, the touch electrode layer further includes: second lap joint parts, the second lap-joint parts are connected to the first touch electrodes or the second touch electrodes on the two sides of the second hollowed-out areas.

Optionally, the above-mentioned array substrate provided by the embodiments of the present disclosure further includes: a plurality of pixel electrodes on the side, away from the layer where the gate lines are located, of the touch electrode layer.

The extension direction of the pixel electrodes is parallel to the extension direction of the polyline segments defining the sub-pixel areas where the pixel electrodes are located.

Optionally, in the above-mentioned array substrate provided by the embodiments of the present disclosure, the extension direction of the touch electrode is parallel to the extension direction of the pixel electrode in the same sub-pixel area.

Optionally, the above-mentioned array substrate provided by the embodiments of the present disclosure further includes: a common electrode layer, and the common electrode layer is multiplexed as the touch electrode layer.

Based on the same inventive concept, embodiments of the present disclosure further provide a display device including the above-mentioned array substrate.

DETAILED DESCRIPTION OF THE EMBODIMENTS

In order to make the objectives, technical solutions and advantages of the embodiments of the present disclosure clearer, the technical solutions of the embodiments of the present disclosure are described clearly and completely in conjunction with the accompanying drawings of the embodiments of the present disclosure below. The thickness and shape of each film layer in the accompanying drawings do not reflect the true ratio, but merely schematically illustrate the present disclosure. Apparently, the described embodiments are part of the embodiments of the present disclosure, rather than all of the embodiments. Based on the described embodiments of the present disclosure, all other embodiments obtained by those of ordinary skill in the art without creative labor fall within the protection scope of the present disclosure.

Unless otherwise defined, the technical terms or scientific terms used herein shall have the usual meanings understood by those with ordinary skill in the field to which the present disclosure belongs. The "first", "second" and similar words used in the specification and claims of the present disclosure do not indicate any order, quantity or importance, but are only used to distinguish different components. "Include" or "comprise" and other similar words mean that the element or item appearing before the word encompasses the element or item listed after the word and its equivalents, but does not exclude other elements or items. "Inner", "outer", "upper", "lower" and so on are only used to indicate the relative position relationship. After the absolute position of the described object changes, the relative position relationship may also change accordingly.

In the related art, during a touch operation, a finger forms coupling capacitance between the surface of a touch screen panel and the ground, thereby increasing ground capacitance of a touch electrode and causing capacitance on a touch electrode layer to change. A touch detecting chip (IC) recognizes the change to determine the touch position and reacts, thereby recognizing a touch signal. However, since the touch density is less than the pixels per inch (PPI), a touch electrode covers multiple sub-pixels, for example, a touch electrode covers M*N sub-pixels, M and N are integers greater than 1. Based on this, the touch electrode is bound to overlap with gate lines defining the area where the sub-pixels are located, resulting in large coupling capacitance between the touch electrode and the gate lines, which affects the touch accuracy and display effect.

Figure 1:
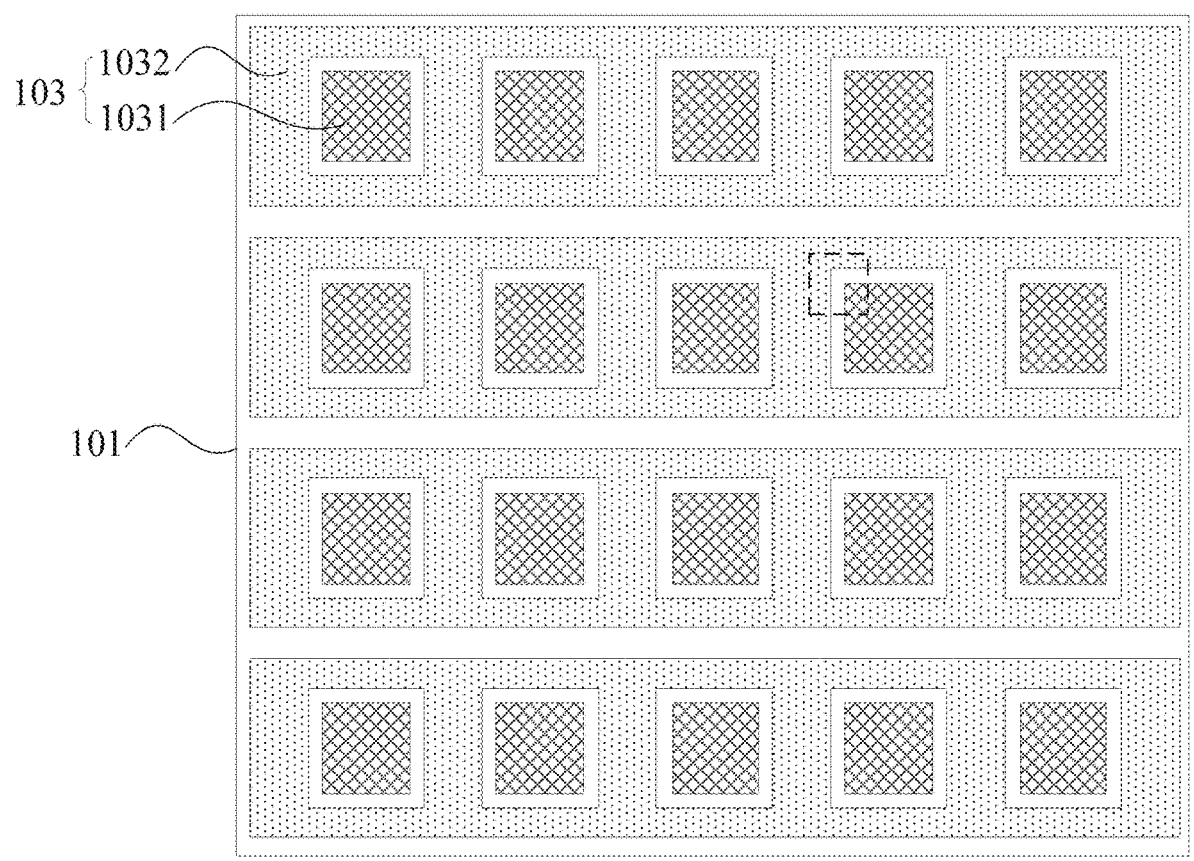
FIG. 1 is a schematic structural diagram of an array substrate provided by an embodiment of the present disclosure.
Figure 2:
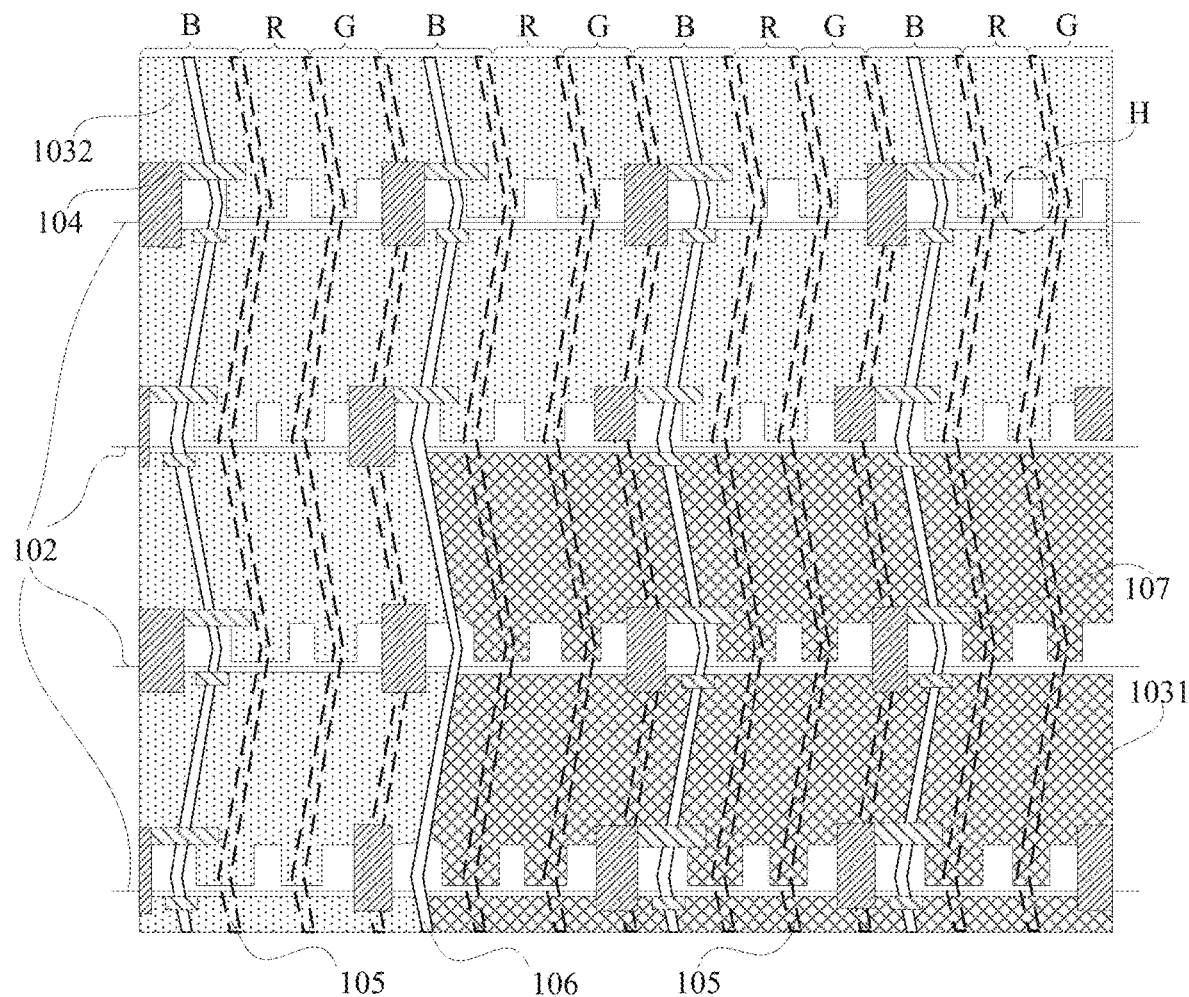
FIG. 2 is an enlarged schematic structural diagram of a dashed box area in FIG. 1.

In view of the above-mentioned problems in the related art, some embodiments of the present disclosure provide an array substrate applicable to products of an oxide (Oxide) process. Specifically, as shown in FIGS. 1 and 2, the array substrate includes:

a base substrate 101;

a plurality of gate lines 102 on the base substrate 101; and a touch electrode layer located on a side, away from the base substrate 101, of a layer where the gate lines 102 are located;

the touch electrode layer includes a plurality of touch electrodes 103, and the touch electrode 103 are provided with first hollowed-out areas at positions of at least part of the gate lines 102.

In the above-mentioned array substrate provided by the embodiments of the present disclosure, since at least part of the gate lines 102 are located in the first hollowed-out areas of the touch electrodes 103, overlap between the touch electrode layer and at least part of the gate lines 102 is avoided, thus coupling capacitance between the gate lines 102 and the touch electrode layer is reduced, the signal-to-noise ratio is lowered, power consumption is reduced, and the touch accuracy and display effect are improved.

It should be noted that in the above-mentioned array substrate provided by the embodiments of the present disclosure, the base substrate 101 may be a flexible base substrate, such as polyvinyl ether phthalate, polyethylene naphthalate, polycarbonate, polyarylate, polyetherimide, polyether sulfone or polyimide and other plastic substrates with excellent heat resistance and durability; the base substrate 101 may also be a rigid base substrate, such as a glass substrate, which is not limited herein. Specifically, the gate lines 102 may be made of molybdenum, aluminum, silver, copper, titanium, platinum, tungsten, tantalum, tantalum nitride, alloys and combinations thereof, or other suitable materials, which are not limited herein.

Optionally, in the above-mentioned array substrate provided by the embodiments of the present disclosure, the touch electrodes 103 are provided with the first hollowed-out areas at the positions of all the gate lines 102, that is, there is no overlap area between the touch electrode layer and all the gate lines 102, therefore, a touch signal on the touch electrode layer and a signal on the gate lines 102 are not coupled with each other, thus mutual interference between the touch signal on the touch electrode layer and the signal on the gate lines 102 is avoided, and the touch accuracy and display effect are further improved.

In the related art, the touch function and the display function are performed in a time-sharing mode within a frame, resulting in insufficient pixel charging rate. Based on this, in order to improve the pixel charging rate, in the above-mentioned array substrate provided by the embodiments of the present disclosure, as shown in FIG. 1, each touch electrode 103 includes a plurality of first touch electrodes 1031, and a second touch electrode 1032 surrounding the first touch electrodes 1031; and the second touch electrode 1032 is spaced and insulated from each of the first touch electrodes 1031.

In some embodiments, the first touch electrodes 1031 are driving electrodes (Tx sensor), and the second touch electrodes 1032 are sensing electrodes (Rx sensor). In some other embodiments, the first touch electrodes 1031 are sensing electrodes, and the second touch electrodes 1032 are driving electrodes, which is not limited herein.

It can be seen from FIG. 1 that each first touch electrode 1031 and the corresponding second touch electrode 1032 form a concentric-square-shaped ring structure. In this way, the touch position can be recognized based on the principle of self-capacitance and the principle of mutual capacitance at the same time. In addition, the self-capacitance and mutual capacitance integrated technology can also realize the synchronization of the touch function and the display function, thereby increasing the pixel charging rate. Furthermore, the self-capacitance and mutual capacitance integrated technology further has the advantages of supporting active styli and waterproofing, and is suitable for the development of notebook (NB) products that comply with the stylus protocol. Besides, it can be understood that in the case of the same product size, the number of self-capacitance and mutual capacitance integrated touch electrodes provided in the present disclosure is less than the number of touch electrodes based on single self-capacitance or single mutual capacitance, and therefore the number of touch channels can be reduced, and the narrow frame design is achieved.

Optionally, in the above-mentioned array substrate provided by the embodiments of the present disclosure, as shown in FIG. 2, the touch electrode layer further includes: a plurality of first lap-joint parts 104, the first lap-joint parts 104 are connected to the first touch electrodes 1031 or the second touch electrodes 1032 on the two sides of the first hollowed-out areas.

Since the interior of the same first touch electrode 1031 is disconnected due to the arrangement of the first hollowed-out area, the signal consistency on the same first touch electrode 1031 is ensured by arranging the corresponding first lap-joint part 104. In the same way, the interior of the same second touch electrode 1032 is disconnected due to the arrangement of the first hollowed-out area, and the signal consistency on the same second touch electrode 1032 is ensured by arranging the corresponding first lap-joint part 104.

In addition, it can be understood that the first touch electrodes 1031 and the second touch electrodes 1032 need to be insulated from each other. Therefore, the first lap-joint parts 104 do not need to be arranged to connecting the first touch electrodes 1031 and the second touch electrodes 1032 on the two sides of the first hollowed-out areas. In other words, gaps formed by the first hollowed-out areas are reserved between the first touch electrodes 1031 and the second touch electrodes 1032 to ensure that there is no short between the first touch electrodes 1031 and the second touch electrodes 1032, so that signals of the first touch electrodes and the second touch electrodes do not interfere.

Optionally, in the above-mentioned array substrate provided by the embodiments of the present disclosure, as shown in FIG. 2, the array substrate may further include a plurality of data lines 105 intersecting with the gate lines 102, and the first lap-joint parts 104 are arranged in blue sub-pixel areas B defined by the gate lines 102 and the data lines 105 in a one-to-one correspondence mode.

Since coupling capacitance may exist between the first lap joint parts 104 and the gate lines 102 located in the first hollowed-out areas to a certain extent, it is necessary to set the number and positions of the first lap-joint parts 104 reasonably. The first lap-joint parts 104 are arranged in the blue sub-pixel areas B defined by the gate lines 102 and data lines 105 in a one-to-one correspondence mode, which not only ensures the signal uniformity on the first touch electrodes 1031 or the second touch electrodes 1032, but also avoids large coupling interference between the first lap-joint parts 104 and the gate lines 102 due to excessive first lap-joint parts 104.

Optionally, in the above-mentioned array substrate provided by the embodiments of the present disclosure, as shown in FIG. 2, the sub-pixel areas defined by the gate lines 102 and the data lines 105 may specifically be red sub-pixel areas R, green sub-pixel areas G, and blue sub-pixel areas. The color of the sub-pixel areas in the same column is the same, and "the red sub-pixel area R, the green sub-pixel area G and the blue sub-pixel area B" are cyclically arranged in a cycle in the row direction. The column of the red sub-pixel area R, the column of the green sub-pixel area G, and the column of the blue sub-pixel area B included in each cycle form a pixel column, and each column of sub-pixel areas corresponds to a data line 105.

Optionally, in the above-mentioned array substrate provided by the embodiments of the present disclosure, as shown in FIG. 2, each data line 105 is composed of a plurality of polyline segments, and the angle between each of the polyline segments and the vertical direction of the gate lines 102 is an acute angle, and two polyline segments located on the two sides of the same gate line 102 are in mirror symmetry with respect to the gate line 102.

In the related art, linear data lines extending in a direction perpendicular to the gate lines 102 is prone to cause light interference with regular shapes (such as black matrix patterns) in a touch screen panel, causing moire phenomenon, which affects the display effect. Based on this, by arranging the data lines 105 as a wavy structure composed of multiple polyline segments, moire patterns of the data line 105 caused by light interference due to regular patterns can be reduced, and the visibility of the moire patterns on the surface of the touch screen panel can be eliminated, and the display quality is improved.

Optionally, in the above-mentioned array substrate provided by the embodiments of the present disclosure, as shown in FIG. 2, the array substrate further includes: a plurality of touch lines 106 arranged in the same layer as the data lines 105, and the extension direction of the touch lines 106 is parallel to the extension direction of the data lines 105.

The touch electrodes 103 are provided with second hollowed-out areas, of which the extension direction is parallel to the extension direction of the touch lines 106, at the positions of the touch lines 106.

It should be noted that in the present disclosure, "same layer arrangement" refers to a layer structure formed by: forming film layers through the same film forming process for forming specific patterns, and then performing a single patterning process with the same mask plate on the film layers. That is, the single patterning process corresponds to one mask plate. A single patterning process may include multiple exposure, development or etching processes according to the differences of specific patterns, and the specific patterns in the formed layer structure may be continuous or discontinuous, and these specific patterns may also be at different heights or have different thicknesses. Therefore, the touch lines 106 and the data lines 105 are arranged in the same layer, the masking process can be reduced, and the production efficiency is improved.

In the related art, a touch line 106 generally overlaps with a column of touch electrodes 103 and is electrically connected to a certain one of the column of touch electrodes 103 to recognize the capacitance change of the one touch electrode 103. Apparently, coupling capacitance exists between the touch line 106 and the other touch electrodes 103 in the column other than the touch electrode 103 electrically connected to the touch line 106, which affects the touch accuracy. By providing the touch electrodes 103 with the second hollowed-out areas whose extension direction is parallel to the extension direction of the touch lines 106 at the positions of the touch lines 106, overlap between the touch electrodes 103 and the touch lines 106 is avoided, so that no coupling capacitance exists between the touch electrodes 103 and the touch lines 106, which improves the touch accuracy.

In addition, by setting the touch lines 106 as the same wavy structure as the data lines 105, the moire patterns caused by the light interference due to the regular patterns of the touch lines 106 can be reduced, the visibility of the moire patterns on the surface of the touch screen panel is eliminated, and the display quality is improved.

Specifically, in the above-mentioned array substrate provided by the embodiments of the present disclosure, the touch lines 106 include touch drive lines (Tx line) and touch sensing lines (Rx line). Since the touch drive lines and touch sensing lines are parallel to the extension direction of the data lines 105, touch detecting chips may be arranged on the same side of the array substrate to realize single-side driving, and a narrow frame effect is achieved.

It can be understood that in FIG. 2, since the touch electrode layer is provided with the second hollowed-out areas at the positions of the touch lines 106 and is not provided with hollowed-out areas at the positions of the data lines 105, the positions of the touch lines 106 are shown as solid lines, and the positions of the data lines 105 are shown as dashed lines in FIG. 2.

Optionally, in the above-mentioned array substrate provided by the embodiments of the present disclosure, as shown in FIG. 2, the touch lines 106 are located in the blue sub-pixel areas B defined by the gate lines 102 and the data lines 105.

In the related art, the touch lines 106 are generally arranged at the column gaps of the sub-pixels, and in order to avoid a short circuit with the original data lines 105 at the column gaps, the column gaps are widened generally, so that the data lines 105 and the touch lines 106 are kept at a certain distance to be insulated. In order to ensure display uniformity, sometimes corresponding black matrixes (BM) blocking the data lines 105 need to be widened, which greatly affects the pixel aperture ratio. In the present disclosure, by arranging the touch lines 106 in the blue sub-pixel areas B, the situation that the data lines 105 and the touch lines 106 are arranged at the column gaps simultaneously is avoided, the width of the column gaps is reduced, and the pixel aperture ratio is ensured. Moreover, since the sensitivity of human eyes to blue is weaker than that of human eyes to red and green, arranging the touch lines 106 in the blue sub-pixel areas B will not affect the viewing experience.

Optionally, in the above-mentioned array substrate provided by the embodiments of the present disclosure, as shown in FIG. 2, the area of the touch electrodes 103 in the blue sub-pixel areas B is larger than the area of the touch electrodes 103 in red sub-pixel areas R and green sub-pixel areas G defined by the gate lines 102 and the data lines 105.

That is, the width of the first touch electrodes 1031 and the second touch electrodes 1032 in the blue sub-pixel areas B is designed to be larger than that in the red sub-pixel areas R and the green sub-pixel areas G. In this way, on the one hand, the extra width of the first touch electrodes 1031 and the second touch electrodes 1032 in the blue sub-pixel areas B compared with that in the red sub-pixel areas R and the green sub-pixel areas G can be used to set the second hollowed-out areas; on the other hand, the first touch electrodes 1031 and the second touch electrodes 1032 in the blue sub-pixel areas B have the rest same width as the touch electrodes in the red sub-pixel areas R and the green sub-pixel areas G, which can also ensure that the light emission effects of the red sub-pixel areas R, the green sub-pixel areas G and the blue sub-pixel areas B are basically unchanged, and the display effect of a product is not affected.

Optionally, in the above-mentioned array substrate provided by the embodiments of the present disclosure, as shown in FIG. 2, the touch electrode layer further includes: second lap-joint parts 107, the second lap-joint parts 107 are connected to the first touch electrodes 1031 or the second touch electrodes 1032 on the two sides of the second hollowed-out areas.

Since the interior of the same first touch electrode 1031 is disconnected due to the arrangement of the second hollowed-out areas, the arrangement of the second lap-joint parts 107 ensures the signal consistency on the same first touch electrode 1031. In the same way, the interior of the same second touch electrode 1032 is disconnected due to the arrangement of the second hollowed-out area, and the arrangement of the second lap joint parts 107 also ensures the signal consistency on the same second touch electrode 1032.

It is worth noting that since the touch electrodes 103 are provided with the first hollowed-out areas at the positions of the gate lines 102, that is, the touch electrodes 103 between the gate lines 102 are relatively independent without considering the first lap-joint parts 104, so that the second lap-joint parts 107 need to be arranged on the two sides of the gate lines 102 (namely the two ends, adjacent to the gate lines 102, of each pixel), as shown in FIG. 2 to connect the touch electrodes 103 (namely the first touch electrodes 1031 or the second touch electrodes 1032) located on the two sides of the second hollowed-out areas.

In addition, it can be understood that the first touch electrodes 1031 and the second touch electrodes 1032 need to be insulated from each other. Therefore, the first touch electrodes 1031 and the second touch electrodes 1032 on the two sides of the second hollowed-out areas do not need to be connected by arranging second lap-joint parts 107. In other words, gaps formed by the second hollowed-out areas are reserved between the first touch electrodes 1031 and the second touch electrodes 1032 to ensure that no short occurs between the first touch electrodes 1031 and the second touch electrodes 1032, and signals of the first touch electrodes 1031 and the second touch electrodes 1032 do not interfere.

Figure 3:
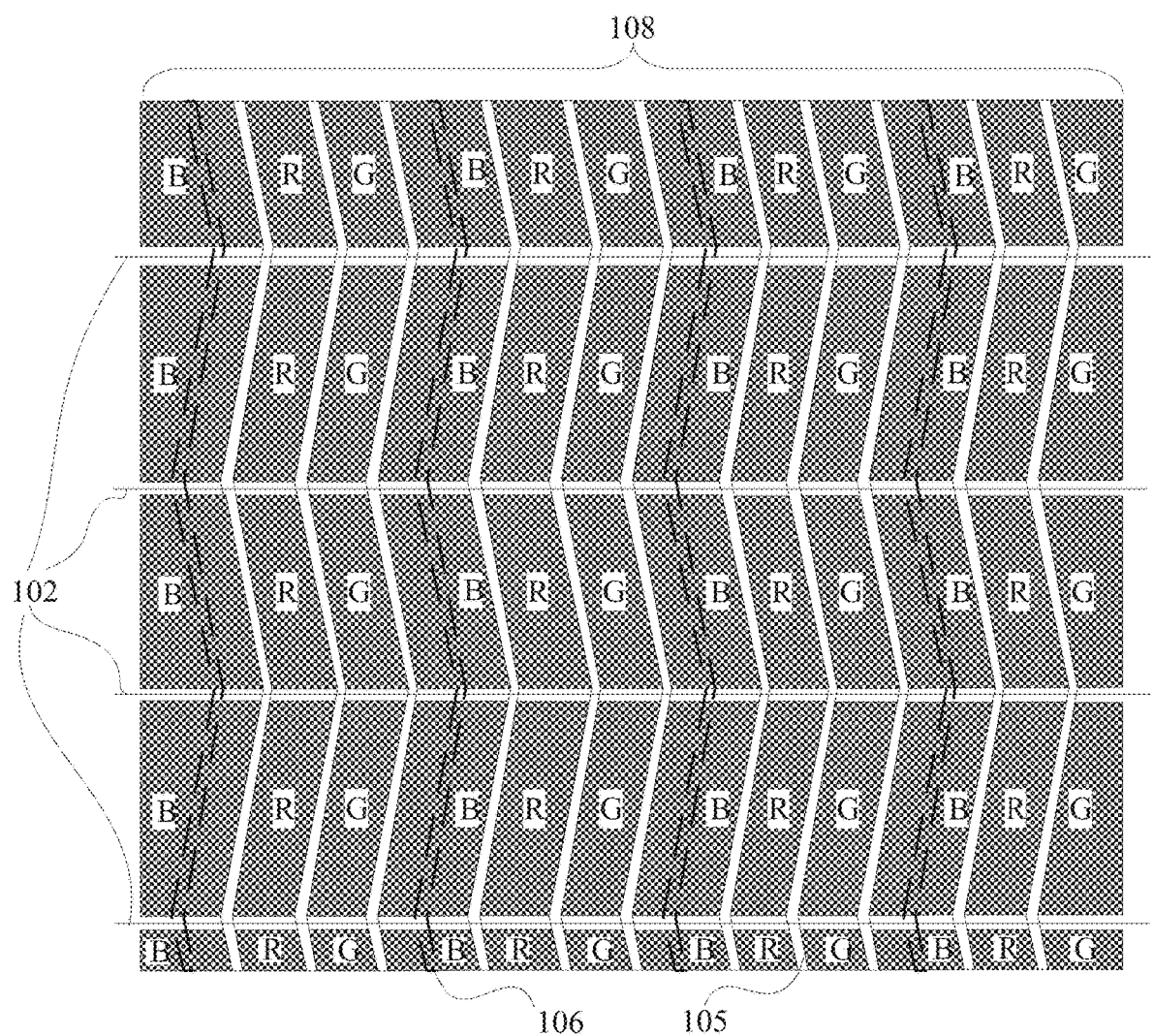
FIG. 3 is another schematic structural diagram of an array substrate provided by an embodiment of the present disclosure.

Optionally, in the above-mentioned array substrate provided by the embodiments of the present disclosure, as shown in FIG. 3, the array substrate further includes: a plurality of pixel electrodes 108 on the side, facing away from the layer where the gate lines 102 are located, of the touch electrode layer.

The extension direction of the pixel electrodes 108 is parallel to the extension direction of the polyline segments defining the sub-pixel areas where the pixel electrodes 108 are located, and the pixel electrodes 108 include a plurality of strip electrodes connected in parallel, and the strip electrode is parallel to the extension direction of the polyline segments.

Since the angle between the polyline segments and the vertical direction of the gate lines 102 is an acute angle, the pixel electrodes 108 is provided with a domain with the inclination being the acute angle when the extension direction of the pixel electrodes 108 is parallel to the extension direction of the polyline segments defining the sub-pixel areas where the pixel electrodes 108 are located. Besides, since the two polyline segments located on the two sides of the same gate line 102 are mirror-symmetrical with respect to the gate line 102, the two pixel electrodes 108 on the two sides of the same gate line 102 are provided with two domains (namely 2 Pixel 2 Domain). The pixel electrodes 108 are designed to have a certain pre-tilt angle, and better transmittance and light efficiency can be achieved.

It can be understood that in FIG. 3, since a pixel electrode layer is not provided with a hollowed-out area at the positions of the touch lines 106, but provided with gaps at the positions of the data lines 105, the positions of the data lines 105 are shown with solid lines, and the positions of the touch lines 106 are shown with dashed lines in FIG. 3.

Optionally, in the above-mentioned array substrate provided by the embodiments of the present disclosure, as shown in FIGS. 2 and 3, in the same sub-pixel area (such as the red sub-pixel area R, the green sub-pixel area G or the blue sub-pixel area B), the extension direction of the touch electrodes 103 (including the first touch electrodes 1031 or the second touch electrodes 1032) is parallel to the extension direction of the pixel electrodes 108.

By controlling the extension direction of the touch electrodes 103 and the pixel electrodes 108 in the same sub-pixel area to be parallel, the touch electrodes 103 and the pixel electrodes 108 in the same sub-pixel area overlap in the direction perpendicular to the base substrate 101, and the effect that when the touch electrodes 103 and common electrodes are multiplexed, a strong electric field can be formed between the touch electrodes 103 and the pixel electrodes 108 to control the deflection of a liquid crystal and achieve a good display effect is ensured.

Optionally, the above-mentioned array substrate provided by the embodiments of the present disclosure further includes: a common electrode layer, and the common electrode layer is multiplexed as the touch electrode layer.

By multiplexing the touch electrode layer as a common electrode layer, the thickness of a touch screen panel can be reduced, and a lightening and thinning design can be realized. Optionally, the first touch electrodes 1031, the second touch electrodes 1032, the first lap-joint parts 104 and the second lap-joint parts 107 included in the touch electrode layer may be made of the same material in the same layer. When the first touch electrodes 1031, the second touch electrodes 1032, the first lap-joint parts 104 and the second lap-joint parts 107 are made of the same material in the same layer, the first touch electrodes 1031, the second touch electrodes 1032, the first lap joint parts 104 and the second lap-joint parts 107 may be manufactured simultaneously to simplify the manufacturing process of the array substrate. Optionally, the first touch electrodes 1031, the second touch electrodes 1032, the first lap-joint parts 104 and the second lap-joint parts 107 are made of a transparent conductive material. Exemplarily, the first touch electrodes 1031, the second touch electrodes 1032, the first lap-joint parts 104 and the second lap joint parts 107 are made of materials with good light transmittance and conductivity, such as indium tin oxide or indium zinc oxide.

Optionally, the above-mentioned array substrate provided by the embodiments of the present disclosure generally may further include transistors. When the touch electrode layer is multiplexed as a common electrode layer, an insulating layer is arranged between the pixel electrodes 108 and the common electrode layer. Moreover, when the common electrode layer is arranged between the transistors and the pixel electrodes 108, the pixel electrodes 108 may be electrically connected to the transistors through via holes H on the common electrode layer. Further, in order to simplify the process, the via holes H and the first hollowed-out areas may be integrated, as shown in FIG. 2. Specifically, the via holes H may be in various shapes, such as a circle, a triangle, a rectangle, a rhombus, a trapezoid, a five-pointed star, a regular polygon and any regular or irregular shapes, which are not limited herein.

Based on the same inventive concept, the embodiments of the present disclosure further provide a display device including the above-mentioned array substrate provided in the embodiments of the present disclosure. The display device may be: a liquid crystal display panel, a mobile phone, a tablet computer, a television, a monitor, a notebook computer, a digital photo frame, a navigator, a smart watch, a fitness wristband, a personal digital assistant and any other products or components with display functions. Other indispensable parts of the display device should be understood by those of ordinary skill in the art, are not described in detail herein, and should not be used as a limitation on the present disclosure. In addition, since the principle of solving the problem of the display device is similar to the principle of solving the problem of the above-mentioned display panel, the implementation of the display device may refer to the embodiments of the above-mentioned display panel, and is not described in detail herein.

In the above-mentioned array substrate and the display device provided by the embodiments of the present disclosure, since at least part of the gate lines are located in the first hollowed-out areas of the touch electrodes, overlap between the touch electrode layer and at least part of the gate lines is avoided, thereby coupling capacitance between the gate lines and the touch electrode layer is reduced, and the touch accuracy and display effect are improved.

Apparently, those skilled in the art can make various modifications and variations to the embodiments of the present disclosure without departing from the spirit and scope of the embodiments of the present disclosure. Then if these modifications and variations of the embodiments of the present disclosure fall within the scope of the claims of the present disclosure and equivalent technologies thereof, the present disclosure also intends to include these modifications and variations.

What is claimed is:

1. An array substrate, comprising:
   a base substrate;
   a plurality of gate lines on the base substrate;
   a touch electrode layer located on a side, away from the base substrate, of a layer where the gate lines are located; wherein the touch electrode layer comprises a plurality of touch electrodes, and the touch electrodes are provided with first hollowed-out areas at positions of at least part of the gate lines;
   a plurality of data lines intersecting with the gate lines; and
   a plurality of touch lines arranged in a same layer as the data lines;
   wherein an extension direction of the touch lines is parallel to an extension direction of the data lines; and
   the touch electrodes are further provided with second hollowed-out areas at positions of the touch lines, and an extension direction of the second hollowed-out areas is parallel to the extension direction of the touch lines.

2. The array substrate according to claim 1, wherein the touch electrodes are provided with the first hollowed-out areas at positions of all the gate lines.

3. The array substrate according to claim 1, wherein the touch electrodes each comprises:
   a plurality of first touch electrodes; and
   a second touch electrode surrounding the first touch electrodes;
   wherein the second touch electrode is spaced and insulated from each of the first touch electrodes.

4. The array substrate according to claim 3, wherein the touch electrode layer further comprises:
   a plurality of first lap-joint parts;
   wherein the first lap-joint parts are connected to the first touch electrodes or the second touch electrodes on two sides of the first hollowed-out areas.

5. The array substrate according to claim 4,
   wherein the first lap-joint parts are arranged in blue sub-pixel areas defined by the gate lines and the data lines in a one-to-one correspondence mode.

6. The array substrate according to claim 5, wherein the data lines each is composed of a plurality of polyline segments, and an angle between each of the polyline segments and a vertical direction of the gate lines is an acute angle, and two polyline segments located on two sides of a same gate line are in mirror symmetry with respect to the same gate line.

7. The array substrate according to claim 1, wherein the touch lines are located in blue sub-pixel areas defined by the gate lines and the data lines.

8. The array substrate according to claim 7, wherein an area of the touch electrodes in the blue sub-pixel areas is larger than an area of the touch electrodes in red sub-pixel areas and green sub-pixel areas defined by the gate lines and the data lines.

9. The array substrate according to claim 3, wherein the touch electrode layer further comprises:
   second lap-joint parts;
   wherein the second lap-joint parts are connected to the first touch electrodes or the second touch electrodes on two sides of the second hollowed-out areas.

10. The array substrate according to claim 6, further comprising:
    a plurality of pixel electrodes on a side, away from the layer where the gate lines are located, of the touch electrode layer; and
    an extension direction of the pixel electrodes is parallel to an extension direction of the polyline segments defining sub-pixel areas where the pixel electrodes are located.

11. The array substrate according to claim 10, wherein an extension direction of a touch electrode is parallel to an extension direction of a pixel electrode, and the touch electrode and the pixel electrode are in a same sub-pixel area.

12. The array substrate according to claim 1, further comprising:
    a common electrode layer;
    wherein the common electrode layer is multiplexed as the touch electrode layer.

13. A display device, comprising: an array substrate, wherein the array substrate comprises:
    a base substrate;
    a plurality of gate lines on the base substrate;
    a touch electrode layer located on a side, away from the base substrate, of a layer where the gate lines are located; wherein the touch electrode layer comprises a plurality of touch electrodes, and the touch electrodes are provided with first hollowed-out areas at positions of at least part of the gate line;
    a plurality of data lines intersecting with the gate lines; and
    a plurality of touch lines arranged in a same layer as the data lines;
    wherein an extension direction of the touch lines is parallel to an extension direction of the data lines; and the touch electrodes are further provided with second hollowed-out areas at positions of the touch lines, and an extension direction of the second hollowed-out areas is parallel to the extension direction of the touch lines.

14. The display device according to claim 13, wherein the touch electrodes each comprises:
    a plurality of first touch electrodes; and
    a second touch electrode surrounding the first touch electrodes;
    wherein the second touch electrode is spaced and insulated from each of the first touch electrodes.

15. The display device according to claim 14, wherein the touch electrode layer further comprises:
    a plurality of first lap-joint parts;
    wherein the first lap-joint parts are connected to the first touch electrodes or the second touch electrodes on two sides of the first hollowed-out areas.

16. The display device according to claim 15,
    wherein the first lap-joint parts are arranged in blue sub-pixel areas defined by the gate lines and the data lines in a one-to-one correspondence mode.

17. The display device according to claim 16, wherein the data lines each is composed of a plurality of polyline segments, and an angle between each of the polyline segments and a vertical direction of the gate lines is an acute angle, and two polyline segments located on two sides of a same gate line are in mirror symmetry with respect to the same gate line.

18. The display device according to claim 17, wherein the array substrate further comprises:
    a plurality of pixel electrodes on a side, away from the layer where the gate lines are located, of the touch electrode layer; and
    an extension direction of the pixel electrodes is parallel to an extension direction of the polyline segments defining sub-pixel areas where the pixel electrodes are located.

19. The display device according to claim 14, wherein the touch electrode layer further comprises:
    second lap-joint parts;
    wherein the second lap-joint parts are connected to the first touch electrodes or the second touch electrodes on two sides of the second hollowed-out areas.

20. The display device according to claim 18, wherein an extension direction of a touch electrode is parallel to an extension direction of a pixel electrode, and the touch electrode and the pixel electrode are in a same sub-pixel area.

* * * * *